United States Patent Office 3,305,542
Patented Feb. 21, 1967

3,305,542
POLYETHERS OF LEVOGLUCOSAN
Lawrence G. Carlberg, Bellevue, and Fraidoun Shafizadeh, Seattle, Wash., assignors to Weyerhaeuser Company, Tacoma, Wash., a corporation of Washington
No Drawing. Filed Mar. 25, 1965, Ser. No. 442,799
4 Claims. (Cl. 260—209)

This invention relates to a new composition of matter. More specifically, this invention relates to a new composition of matter produced by reacting levoglucosan and an alkylene oxide to produce a polyether polyol which can be further reacted to produce polyurethanes.

A variety of carbohydrate compounds are derived from wood and wood waste materials. Large scale industrial application of these carbohydrate compounds could form the basis for a substantial wood waste industry. One of these compounds is levoglucosan. Levoglucosan may be derived from sawdust by pyrolysis and has the following formula:

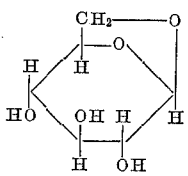

As can be seen from the above formula, there are three reactive hydroxyl groups. It has been discovered that levoglucosan can be converted to a useful polyether polyol by reacting the levoglucosan and a suitable alkylene oxide. The alkylene oxide will react with the three hydroxyl groups to produce the polyether polyol. The alkylene oxide may be selected from the group consisting of ethylene oxide, propylene oxide, butylene oxide, and mixtures thereof. The amount of alkylene oxide added to the levoglucosan to react therewith may range from 0.70 to 25 moles of the alkylene oxide per hydroxyl group of the levoglucosan. Accordingly, the hydroxypropylation of the levoglucosan will provide the following compound illustrated by the following formula:

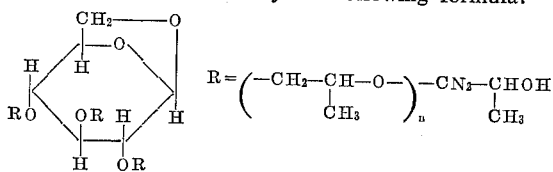

wherein $n$ may range up to 24.

After levoglucosan has been converted to a polyether polyol as noted above, the resulting reaction product may be used in forming polyurethanes. The properties of the resulting polyurethane will depend largely upon the amount of alkylene oxide that is used. Accordingly, a large number of moles of alkylene oxide per hydroxyl group in the levoglucosan will result in long chain polyether polyols. When this product or compound is reacted with a di- or polyisocyanate in the presence of a catalyst, the resulting polyurethane will be flexible. Conversely, if a small amount of alkylene oxide is used per mole of hydroxyl, and thereafter the compound is reacted with a di- or polyisocyanate in the presence of a catalyst, the resulting polymer will be rigid in nature.

The catalyst used for reacting the levoglucosan with the alkylene oxide may be selected from a group consisting of basic acting compounds such as alkali metal hydroxides or alkoxides. A suitable catalyst can be prepared by reacting levoglucosan with alkylene oxide and a triethylamine catalyst and further reaction of the resulting product in a suitable nonreactive solvent, such as benzene, with metallic sodium or potassium. The resulting alcoholate can serve as catalyst for reaction with further amounts of levoglucosan and alkylene oxide to prepare a product having any desired addition of alkylene oxide. With this process, water or other hydroxyl-containing materials are completely eliminated to reduce side reactions. This results in a polyether without the formation of alkylene oxide homopolymers which would contaminate the material.

The etherification of the hydroxyl groups of the levoglucosan with propylene oxide transforms the solid levoglucosan into a viscous polyether polyol containing secondary hydroxyl groups which are suitable for further reaction with isocyanates to form urethane foams. In this reaction other alkylene oxides such as ethylene oxide or butylene oxide may be used. Accordingly, a urethane foam can be prepared by using the levoglucosan initiated polyether polyols as described above. This formulation includes reacting the polyether polyol with a di- or polyisocyanate in the presence of suitable catalysts, surface active agents, and blowing agents with techniques known in the art. According to the employed formulation, polyurethane polymers other than foams may be also obtained.

In order to further illustrate the merits of the present invention, the following examples are given.

*Example I*

Levoglucosan (100 g.), propylene oxide (107 g.), and triethylamine (1.04 g.) were placed in a 2 liter stirred autoclave which was fitted with internal cooling coils. The autoclave was heated to 120° C. with stirring, whereupon an exothermic reaction commenced, continuing for about 40 minutes, at which time the pressure had fallen to normal, indicating the completed reaction. The product was removed from the autoclave and the weight uptake indicated a 93% reaction to form the 2,3,4-tris(hydroxypropyl) levoglucosan. The product was found to have a hydroxyl content of 15.1% or an average of 0.93 hydroxypropyl groups per hydroxyl group of levoglucosan. It also had a specific gravity of 1.21 at 25° C. and a Brookfield viscosity of 21,250 cps. at 25° C. Twenty grams of the above reaction product were refluxed for 15 hrs. in 50 cc. of benzene with 1.0 g. clean potassium shavings to produce the alcoholate. The above catalyst solution was concentrated to remove benzene and the product was added to a mixture of 138 g. levoglucosan and 157 g. propylene oxide in the stirred autoclave. This reaction mixture was heated to 160° C. where a vigorous exothermic reaction began. After 35 minutes reaction, the pressure returned to normal indicating the reaction was completed. The product was recovered in a 96% yield and was found to have a Brookfield viscosity of 6120 cps. at 25° C. and a hydroxyl content of 11.8% or an average 1.59 hydroxypropyl groups per hydroxyl group of levoglucosan. The potassium catalyst may be removed by the addition of tartaric acid which forms the insoluble potassium tartrate.

*Example II*

Levoglucosan (162 g.=1 mole) was dissolved in 38 cc. water at about 75° C. and 2.5 cc. of 10% aqueous KOH added. The resulting mixture was placed in a stirred autoclave, flushed with nitrogen to remove air and then heated to 165° to remove the solvent. A vacuum (1–5 mm. pressure) was applied for about 5 minutes to remove the last traces of water. Gaseous propylene oxide, which can be generated in an auxiliary autoclave by heating at 100° C., was then admitted to the fused levoglucosan catalyst mixture and the stirred reaction was maintained at about 165° C., and 60–90 p.s.i.g. until complete (2 hrs. in this case). After reaction, a vacuum was applied to the reactor to strip off any volatiles which may have been present and the product (467 g.) was removed. The product which had a pH of 11.73 (measured as a 20% solution in a solvent containing 10 parts methanol to 1 part water) was then neutralized by adding the stoichiometric amount (0.335 g.) of tartaric acid. The mixture was stirred at about 75° C. and the resulting potassium tartrate was removed by filtering through diatomaceous earth. The resulting clear, amber colored product was found to have the following properties: pH=7.25, viscosity=8,150 cps. @ 25° C.; specific gravity @ 25° C.=1.084; hydroxyl number=362. The average addition of proylene oxide was 1.75 moles per hydroxyl group of levoglucosan when calculated on the basis of weight uptake and 1.78 when based on a hydroxyl group determination.

Five other samples were prepared in the same manner as set forth in Example II, resulting in products having properties as listed in Table I.

TABLE I

| Sample | Average Moles PO per OH | Sp. Gr. | Visc. cps. at 25° C. | OH# |
|---|---|---|---|---|
| 1 | 2.30 | 1.11 | 3,270 | 300 |
| 2 | 1.38 | 1.16 | 17,250 | 418 |
| 3 | 9.4 | 1.02 | 540 | 120 |
| 4 | 15.5 | 1.02 | 456 | 89 |
| 5 | 21.2 | 1.00 | 468 | 70.5 |

*Example III*

Levoglucosan (54.0 g=0.33 mole) was placed in a 300 cc. Morton flask fitted with a stirrer, thermometer, gas entry and exit fittings, and a heating mantle. The gas ports were connected to mineral oil bubblers to control pressure and to keep the system dry. The flask was heated with vigorous stirring to 180° C. to fuse the levoglucosan in the presence of a stream of nitrogen. Powdered KOH (0.16 g.) was added. Ethylene oxide was then slowly added to the flask while the temperature was dropped from 180 to 150–160° C. over 1½ hrs. and the reaction was continued at this temperature for an additional 3¾ hrs. The product was removed from the flask and found to weigh 144.2 g., the uptake corresponded to an average of 2.05 moles ethylene oxide per hydroxyl group of levoglucosan. Hydroxyl group analysis showed an uptake of 1.95 moles per hydroxyl group.

While various specific examples of preferred procedure embodying the above invention have been described above, it will be apparent that many changes and modifications may be made in those methods of procedure without departing from the spirit of the invention. It should, therefore, be understood that the examples cited and the methods of procedure set forth above are intended to be illustrative only and are not intended to limit the scope of the invention.

What is claimed is:
1. The reaction product of levoglucosan and an alkylene oxide selected from the group consisting of ethylene oxide, propylene oxide, butylene oxide, and mixtures thereof.
2. The reaction product of levoglucosan and ethylene oxide.
3. The reaction product of levoglucosan and propylene oxide.
4. The reaction product of levoglucosan and an alkylene oxide selected from the group consisting of ethylene oxide, propylene oxide, butylene oxide, and mixtures thereof wherein the amount of alkylene oxide consists of 0.70 to 25 moles of alkylene oxide per hydroxyl group in the levoglucosan.

No references cited.

LEWIS GOTTS, *Primary Examiner.*

JOHNNIE R. BROWN, *Assistant Examiner.*